United States Patent [19]

Araki et al.

[11] 3,930,098

[45] Dec. 30, 1975

[54] METHOD OF MOLDING FIBER REINFORCED PLASTIC FLAT PLATES

[75] Inventors: Kunio Araki; Takashi Sasaki; Yuko Kasahara; Yoshisada Yamashita; Keiichi Yotumoto, all of Takasaki; Hiromi Sunaga, Isezaki; Kiyoshi Tabei, Fujisawa; Kazuo Goto, Takasaki; Kunio Tajiri, Tokyo; Hirokazu Kittaka, Sagamihara, all of Japan

[73] Assignees: Nitto Boseki Co., Ltd., Fukushima; Japan Atomic Energy Research Institute, Tokyo, both of Japan

[22] Filed: May 21, 1973

[21] Appl. No.: 362,306

[30] Foreign Application Priority Data

May 24, 1972 Japan.............................. 47-050791

[52] U.S. Cl. ................. 428/280; 264/25; 264/166; 264/231; 264/236; 428/224; 428/364
[51] Int. Cl.² ......................................... B29H 5/01
[58] Field of Search ............ 264/25, 231, 236, 347, 264/289, 166; 161/170

[56] References Cited
UNITED STATES PATENTS

| | | | |
|---|---|---|---|
| 2,956,310 | 10/1960 | Roop et al. | 264/216 |
| 3,339,001 | 8/1967 | Petry et al. | 264/231 |
| 3,383,448 | 5/1968 | Bader et al. | 264/166 |
| 3,592,882 | 7/1971 | Morita | 264/236 |
| 3,600,490 | 8/1971 | Billingsley et al. | 264/216 |

Primary Examiner—Robert F. White
Assistant Examiner—T. E. Balhoff
Attorney, Agent, or Firm—Browdy and Neimark

[57] ABSTRACT

A fiber reinforced plastic (FRP) flat plate having no warps is continuously prepared by curing a continuous FRP plate molding material both top and back surfaces of which are covered with film-like sheetings by means of an ionizing radiation. In the process, the FRP molding material is continuously transported in lengthwise direction, and tensions are given to said film-like sheetings in both lengthwise and widthwise directions before and in the course of the irradiation.

17 Claims, 4 Drawing Figures

METHOD OF MOLDING FIBER REINFORCED PLASTIC FLAT PLATES

BACKGROUND OF THE INVENTION

1. Field of the Invention

This invention relates to a continuous process for preparing a fiber reinforced plastic (hereinafter referred to as FRP) flat plate by means of curing with a ionizing radiation, preferably an electron beam. Particularly, this invention comprises irradiating with an ionizing radiation an FRP plate molding material both top and back surfaces of which are covered with a film-like sheeting, characterized in that the molding material covered with the sheetings is continuously transported and tensions are given to the covered sheetings in both lengthwise and widthwise directions in the course of processing.

2. Description of the Prior Art

Generally, FRP plates have been prepared by impregnating a thermosetting resin such as unsaturated polyester resin containing a curing catalyst in glass fibers, and curing preferably by means of a hot press method.

The heat-curing process has also been applied to a continuous molding of an FRP flat plate. However, the continuous heat-curing process has serious defects in large curing strain such as warps and cracks in appearance and formation of bubbles owing to violent exothermic reaction upon curing. When the generation of heat of reaction is regulated to lower, curing takes several to several-ten minutes. Therefore, it is difficult to continuously prepare an FRP flat plate more than 3 mm in thickness even by employing a large curing furnace. Furthermore, since such curing process takes a considerable long period of time and a liquid resin impregnated in reinforcing fiber material is of fluid nature, it is difficult to keep an FRP molding material in uniform shape and thickness until the impregnated resin is sufficiently cured. Therefore, the resulting product is inferior in mechanical properties to hot-pressed product.

It is known that FRP molding material in small size such as 24 × 12 inches which had been pressed is discontinuously transported on a conveyer and irradiated with electron beam to form FRP plate, as reported in Society of Plastics Engineerings Journal, April 1967, pages 33 - 73. However, this process remains in an experimental scale and is not commercially available, since the warps, creases and unevenness take place more or less on the cured FRP plate. Such defects in the course of curing are further enhanced when a continuous FRP molding material is cured continuously by means of an ionizing radiation such as electron beam, since there was no useful means to maintain the FRP molding material flat and uniform in the course of irradiation. Therefore, it is clear that the continuous process by means of heat curing can not be changed to a continuous process by means of a radiation curing, especially an electron beam curing, by simply replacing heating with irradiation.

It is easily understood by those skilled in the art that a simple replacement of heating with irradiation in the continuous process by means of heat curing could not create the present invention in which a continuous FRP flat plate without strains is advantageously prepared by means of an ionizing radiation.

In summary, the commercially feasible FRP flat plate could have been prepared only by way of a hot press method. However, the hot press method requires a discontinuous processing operation, a long period of time for curing and cooling and a larger scale of the apparatus. Further, an FRP plate of continuous long size can not be obtained by the hot press method.

Incidentally, the conventional FRP flat plates having glossy surfaces have been commercially prepared with a hot press equipped with pressing plates having smooth surfaces such as metal-plated surfaces. Owing to the characteristics of the hot press, many problems in preparing an FRP plate are substantially eliminated, such as non-uniformity of resin materials, formation of bubbles, warps of the plate, rising of fiber materials caused by elastic recovery thereof, sink caused by curing volume contraction, unevenness of the surfaces and the like. This invention advantageously eliminates the above-mentioned problems without employing the conventional hot press and provides a continuous FRP flat plate which could not be prepared by the hot press method.

SUMMARY OF THE INVENTION

The present inventors have succeeded in continuously preparing an FRP flat plate with smooth and glossy surface and without strains such as warps and cracks by means of an ionizing radiation. The process of this invention comprises irradiating with an ionizing radiation a continuous FRP molding material both top and back surfaces of which are covered with film-like sheetings, while the molding material covered with the sheetings is continuously transported in lengthwise direction and tensions are given to the covered sheetings in both lengthwise and widthwise directions in the course of the processing.

An object of this invention is to provide a continuous high-speed process for preparing an FRP flat plate by means of an ionizing radiation according to the above-mentioned process.

Another object of this invention is to provide an FRP flat plate of a long size and irrespective of thickness without strains such as warps and with smooth surface, which is improved in mechanical properties and can be cut in any desired length upon application.

A further object of this invention is to provide an apparatus for continuously preparing an FRP flat plate according to the above-mentioned process.

The other objects of this invention will be made clear in the descriptions of the specification and the appended claims.

DESCRIPTION OF THE PREFERRED EMBODIMENTS

Figure 1:
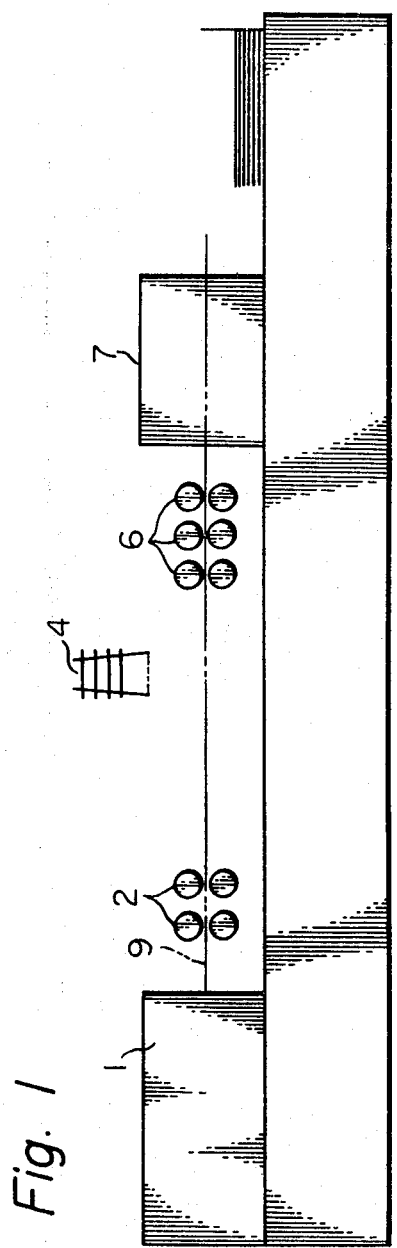
FIG. 1 shows cross-section of an apparatus employed in this invention.
Figure 2:
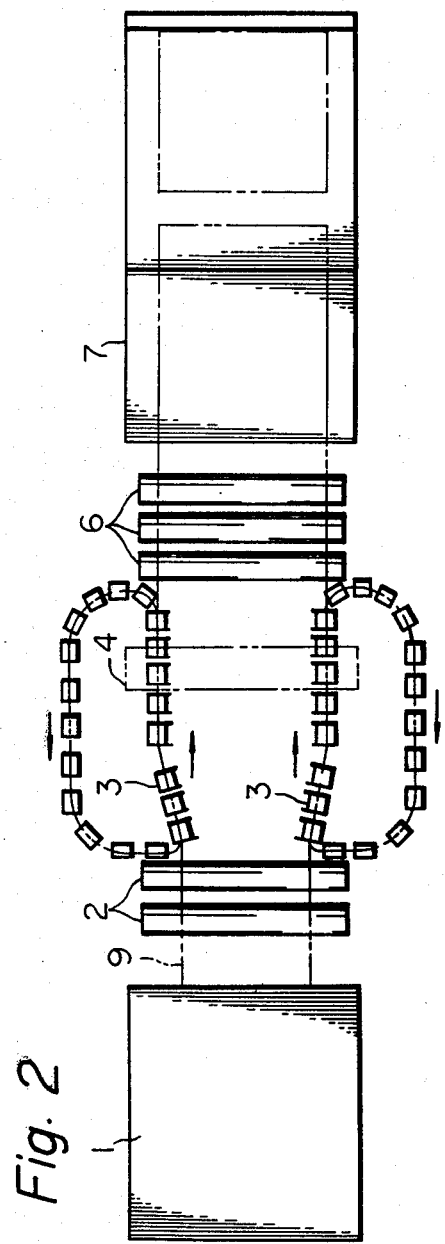
FIG. 2 shows plan view of the same apparatus.

A conventional moding material for FRP plate can be applied to the process of this invention. The FRP plate molding material comprises a reinforcing fiber material impregnated with a liquid resin material curable by means of an ionizing radiation. A conventional filler and/or additive can optionally be added to the curable liquid resin material.

The reinforcing fiber materials comprise a fiber material and typically include a synthetic fiber such as a polyamide fiber, a polyester fiber, a polymeric acrylonitrile fiber, a polymeric vinyl chloride fiber, a polymeric vinyl alcohol fiber; a semi-synthetic fiber such as a rayon; a natural fiber such as cotton and hemp; an inorganic fiber such as a glass fiber, an asbestes, a rock wool, a carbon fiber, a boron fiber, a metal fiber and a whisker. The fibers can be in the form of a yarn, a roving, a staple fiber, non-woven fabrics, a cloth or a combination thereof. The reinforcing fiber materials may be employed in the range of about 3 – 97%, preferably about 5 – 80% by weight of the FRP plate molding materials.

The curable materials comprise a resin, the mixture of a resin and a copolymerizable monomer or a mixture thereof which can be crosslinked and cured by means of an ionizing radiation. Such resin materials include an unsaturated polyester resin such as polyethylene maleate phthalate, an unsaturated acrylic resin, a saturated acrylic resin, a diallyl phthalate resin, a 1,2-polybutadiene resin, a modified epoxy resin such as an acrylic-modified epoxy resin, a modified urethane resin such as an acrylic-modified urethane resin, and a mixture thereof. Usually, these resins are advantageously used as a mixture with a copolymerizable unsaturated monomer or monomers. The resin materials are employed in liquid form in the range of about 1 – 97%, preferably 4 – 95% by weight of the FRP plate molding materials. The liquid resin materials to be employed have generally a viscosity in the range of about 1 – 30 poise at a temperature at which impregnation in the fiber materials is effected.

The fillers to be employed include inorganic filler materials in powder form such as calcium carbonate, gypsum, cement, silica, talc, kaoline, alumina, diatomaceous earth, calcium sulfite, glass powder, mica, glass bease, silicic glass balloon. The fillers may be employed in the range of 0 — about 500 parts by weight of 100 parts of the curable resin materials to be used. The additives to be employed include a coloring material, a releasing agent, a thickening agent, a curing catalyst, an accelerator for curing, a stabilizer for ultraviolet rays and an antiflaming agent. These additives are generally added in the range of 0 — about 15 parts by weight of 100 parts of the curable resin materials. In the case of an antiflaming agent, it may be added up to about 100 parts by weight.

The FRP plate molding material is covered with two continuous film-like sheetings on both top and back surfaces of the molding material. The film-like sheetings are employed for maintaining the shape and thickness of the molding material by applying tensions to the sheetings as well as transporting of the molding material and preventing escape of the resin materials from the molding material. The film-like sheeting should not be swelling or soluble with the curable resin material and is required to be durable to the tensions in both lengthwise and widthwise directions. Such film-like sheetings include a poly (ethylene terephthalate) film a polyamide film, a cellophane film, a substrate such as paper or aluminum foil laminated with polyethylene, polypropylene, polyvinyl alcohol or the like. The thickness of the sheeting is in the range of about 10 – 200 microns. The sheetings of the different species and thickness can be employed in the top and back coverings of the FRP molding materials.

The FRP plate molding materials covered with film-like sheetings can be prepared with a conventional impregnating machine or sheet molding compound machine. One can use an FRP molding material in continuous form on the market such as sheet molding compounds.

The typical mode of practice of this invention is given below by referring to the attached drawings.

An FRP continuous molding material 9 covered with film-like sheetings prepared by the molding material processing machine 1 is compressed with the press rollers 2 and the thickness thereof is controlled. The tension in lengthwise direction is given by the press rollers 2 and the draft rollers 6. While the continuous molding material is transported in lengthwise direction, the tension in widthwise direction is given by gradually expanding the distance between tenters positioned at the both sides of the molding material, wherein the clips 3 of the tenters hold the both edges of the film-like sheetings. Thus, the continuous molding material having smooth surfaces is passed under the scanner 4 of an electron beam accelerator and cured. The resulting cured FRP flat plate is cut in a desired length with cutter 7.

Figure 3:
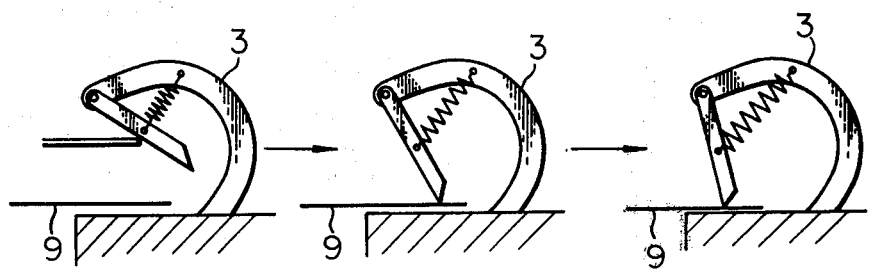
FIG. 3 is an illustration of the clips for tenters which can be employed in this invention.
Figure 3:
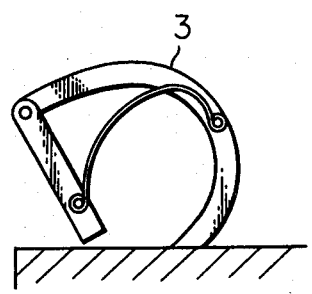

A conventional clip-tenter or pin-tenter can be employed in this apparatus. Any type of the tenters can be employed which can firmly hold the edges of the covering sheetings and does not break the sheetings. The typical example of the clip is shown in FIG. 3. The clips can hold the edges of the covering sheetings at a position either before or after the press rollers 2. It is preferred that the press rollers 2 be situated near the irradiation area such as scanner.

Figure 4:
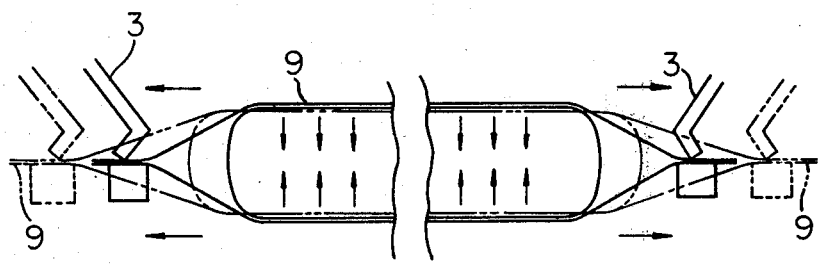
FIG. 4 shows cross-section of the molding material covered with sheetings, wherein tension is given in widthwise direction.

Generally, the same degree of the tensions are applied to the covering sheetings in lengthwise direction by the draft rollers 6 and in widthwise direction by the clip-tenters 3. Thus, the compression in thicknesswise direction and the tensions by friction in both widthwise and lengthwise directions are given to the FRP molding material covered with the film-like sheetings, as shown in FIG. 4. It has been never anticipated that a rising owing to elastic recovery of fiber materials and a sink owing to curing of resin materials can advantageously be controlled by the mechanism of said compression and tensions by friction applied to the FRP molding material. Thus, the FRP molding material is maintained as if it were compressed by a press and can be continuously transported and cured. Furthermore, this invention can advantageously be applied to an FRP molding material about 3 meters in width, since said compression and tensions by friction are effective even when the width of the covering sheetings is about 3 meters or more.

In applying the widthwise tension to the both edges of the covering sheetings, it is preferred that the distance between the adjoining clips is gradually made larger as the FRP molding material covered with sheetings in transported nearer to the irradiation area, so as to avoid the strains of the covering sheetings. The clip mechanisms which have been employed in a bi-axial drawing of a thermoplastic film for giving the widthwise molecular orientation thereto can advantageously be applied as one of the means for controlling the above-mentioned distance between the clips.

After the irradiation, it is preferred that the widthwise tension is temporarily loosened after the irradiation in order to unfasten the clips and smoothly release the covering sheetings.

The tensions to be applied to the film-like sheetings both in lengthwise and widthwise directions may be changed within a range of about 1 - 20 Kg/mm² according to the species and thickness of the sheetings, for example as shown below.

| Species of sheeting | General range of tensions (Kg/mm²) | Preferred range of tensions (Kg/mm²) |
|---|---|---|
| poly(ethylene terephthalate) | 1 - 10 | 3 - 6 |
| 6-polyamide (Nylon-6) | 1 - 12 | 3 - 7 |
| cellophane | 1 - 5 | 2 - 4 |
| polyamide laminated with polyethylene | 1 - 6 | 3 - 4 |
| kraft paper laminated with polyethylene | 1 - 10 | 3 - 5 |
| cellophane laminated with polyethylene | 1 - 6 | 3 - 5 |
| aluminum foil laminated with polyethylene | 1 - 3 | 1.5 - 2.5 |
| poly(ethylene terephthalate) laminated with polyethylene | 1 - 4 | 2 - 3 |
| craft paper laminated with aluminum foil | 1 - 5 | 3 - 4 |

The ionizing radiations to be employed in this invention include $\alpha$ rays, $\beta$ rays, $\gamma$ rays, X rays, electron beam, neutron beam and a mixture thereof. Generally, an electron beam from an accelerator is preferably employed. It is preferred that the electron beam or $\beta$ rays has an energy in the range of about 0.3 - 7.0 MeV and a dose rate of about 0.01 - 20 Mrad/sec. The total dose of the electron beam or $\beta$ rays is about 0.1 - 50 Mrad and preferably about 1 - 10 Mrad. When $\gamma$ rays, X rays, $\alpha$ rays or neutron beam is employed, the dose rate thereof is about $10^2 - 10^8$ rad/hr, and the total dose thereof is about $10^4 - 10^8$ rad and preferably about $10^5 - 10^7$ rad. The curing of the molding material can be promoted by the use of heating or irradiation with ultra-violet light or ultrasonic wave in addition to or after the irradiation with an ionizing radiation. Two or more irradiation sources can be employed from one or both sides of the molding materials.

The main excellent effects obtained by this invention are summarized below.

1. An FRP flat plate having uniform thickness and smooth surfaces can be continuously produced in a large quantity with a short period of time.

2. A continuous FRP flat plate of more than 3 mm in thickness up to the thickness which an ionizing radiation can penetrate and 3 meters or more in width can rapidly be obtained.

3. An FRP flat plate having mechanical properties superior to a conventional hot-pressed FRP plate can be obtained.

This invention is further explained by the foregoing examples. However, this invention should not be limited by these examples, and the changes and modifications within the spirit and scope of this invention can be effected. The quantities and parts in the examples are based on weight unless otherwise specified.

EXAMPLE 1

Seventy parts of the liquid resin material essentially consisting of 100 parts unsaturated polyester resin, 100 parts calcium carbonate, 1.5 parts magnesium oxide and 3.75 parts additionally added styrene was impregnated in 30 parts of glass fiber mat comprising glass fiber roving chopped in 1 cm long. A sheet molding compound (SMC) of about 3 mm thick and about 4.5 Kg/m² was prepared by covering the impregnated glass fiber mat with 50 microns thick poly(ethylene terephthalate) films on both top and back surfaces. Said unsaturated polyester resin comprises 30 parts styrene and 70 parts condensation polymer of 0.5 mol maleic anhydride, 0.5 mol phthalic anhydride and 1.1 mol ethylene glycol, with the acid value 50.

The resulting SMC was passed through press rollers and the thickness thereof was adjusted. Then, the both edges of the covering films were held by the clips of the tenters. The SMC was transported at the velocity of 1 m/min in lengthwise direction. The tensions of about 6 Kg/mm² were given to the covering films in lengthwise direction by the draft rollers and in widthwise direction by the clip-tenters. Thus, the SMC was maintained to show smooth surfaces, no creases and no warps on both top and back surfaces. The SMC was cured with the total dose of 2.5 Mrad electron beam obtained from the electron beam accelerator of 2 MeV and 1 mA. An FRP flat plate of about 3 mm thick having very glossy surfaces and no warps was continuously obtained.

For the comparison, the above Example 1 was repeated without giving the widthwise tension. The resulting FRP flat plate showed warps, uneven surfaces and relief pattern of glass fibers on the top surface, and was not considered to be commercially feasible.

EXAMPLE 2

Sixty(60) parts acrylic-modified epoxy resin was impregnated in 40 parts glass cloth. The resulting molding material of about 2 mm thick was covered with 200 microns thick cellophane on both sides. Said acrylic-modified epoxy resin was prepared by reacting 1000 grams bisphenol type epoxy resin (Shell Epon No. 1001) with 170 grams methacrylic acid in the presence of triethyl amine and dissolving the resulting condensation polymer of acid value 12 in 1100 grams styrene.

The above-prepared SMC was processed in the same way as in Example 1 with the transportation velocity of about 4 m/min, and cured by means of 2 Mrad electron beam from an accelerator or 1.5 MeV and 5 mA. The tensions of about 2 Kg/mm² were given in both lengthwise and widthwise directions in the meantime.

An FRP clear flat plate of about 2 mm thick having very glossy surfaces and no warps was continuously obtained.

EXAMPLE 3

Eighty-five parts of unsaturated acrylic resin was impregnated in 15 parts of polyvinyl alcohol cloth. The resulting molding material was covered with the laminated films of 6-polyamide (Nylon-6) film (20 microns) and polyethylene film (50 microns) on top and back surfaces. Said unsaturated acrylic resin by reacting 1.7 mol methacrylic acid with the copolymer comprising 2.6 mol methyl methacrylate, 5.0 mol of ethyl acrylate and 1.7 mol glycidyl methacrylate, and dissolving the resulting polymer (45.6%) in the mixture of styrene (17.2%) and methyl methacrylate (37.2%).

The resulting SMC was processed as in Example 1 with transportation velocity of about 1.2 m/min. When tensions of 10 Kg/mm² were given in both lengthwise and widthwise directions, electron beam of 10 Mrad from accelerator of 2.5 MeV and 5 mA was irradiated to the SMC. An acrylic semi-transparent FRP flat plate having smooth surfaces and no warps was continuously obtained.

EXAMPLE 4

Seventy-five parts of liquid saturated acrylic resin was impregnated in 25 parts asbestos cloth. The resulting molding material was covered with the films as in Example 3. Curing was effected as in Example 1 at the transportation velocity of about 0.4 m/min with 12 Mrad electron beam from an accelerator of 2.0 MeV and 2 mA, while the tensions of 2 Kg/mm$^2$ were given in both lengthwise and widthwise directions. An acrylic FRP flat plate having smooth surfaces and no warps was continuously obtained.

Incidentally, the above liquid saturated acrylic resin is methyl methacrylate polymer sirup containing about 10% polymer and about 90% monomer, and is generally prepared by polymerizing methyl methacrylate in about 10% yield.

EXAMPLE 5

Fifty parts of acrylic-modified 1,2-polybutadiene resin was mixed with 50 parts glass powder and was impregnated in 10 parts sisal fibers. The resulting molding material was covered with kraft paper (60 g/m$^2$) laminated with polyethylene film (35 microns) on the both surfaces. Said modified polybutadiene resin was prepared by reacting 100 grams epoxylated 1,2-polybutadiene (molecular weight 1000) with 22 grams acrylic acid in the presence of triethyl amine and dissolving the resulting polymer (80%) in methyl methacrylate (20%).

The resulting SMC was processed in the same way as in Example 1 at the transportation velocity of about 8 m/min. The tensions of 5 Kg/mm$^2$ were added in both lengthwise and widthwise directions. Curing was effected with 3 Mrad electron beam from an accelerator of 2.5 MeV and 10 mA.

An FRP flat plate having smooth surfaces and no warps was continuously obtained.

EXAMPLE 6

Seventy-five parts of liquid resin material consisting of unsaturated polyester resin 100 parts, cement 50 parts, calcium carbonate powder 50 parts, magnesium oxide 1.0 part and benzoyl peroxide 2 parts was impregnated in 25 parts of glass mat. The impregnated glass mat was covered with the laminated films of cellophane (50 microns) and polyethylene (50 microns) to prepare the SMC of about 3 cm thick and 45 Kg/m$^2$.

The SMC was processed as in Example 1 with the transportation velocity of 3 m/min and tensions of 4 Kg/mm$^2$ were given in both lengthwise and widthwise directions. Curing was effected with 8 Mrad electron beam from an accelerator of 2.5 MeV and 10 mA. An FRP flat plate having very glossy smooth surfaces and no warps was continuously obtained.

EXAMPLE 7

The SMC employed in Example 6 was cured with a conventional hot press at the pressure of 20 Kg/cm$^2$ at 130°c for 10 minutes and then at 100°C for 2 hours. The mechanical properties of the resulting FRP plate are shown below together with those of the product of Example 6.

| Testing | Hot-pressed FRP plate | Product of Example 6 |
| --- | --- | --- |
| flexural strength (JIS-K-6911) | 18.0 – 19.9 Kg/mm$^2$ | 21.0 – 24.0 Kg/mm$^2$ |
| flexural modulus (JIS-K-6911) | 870 – 1050 Kg/mm$^2$ | 1150 – 1300 Kg/mm$^2$ |
| retension of flexural strength (after heating at 150°C for 24 hours) | 96 – 98 % | 103 – 105 % |
| retension of flexural strength (after heating at 200°C for 24 hours) | 90 – 95 % | 101 – 110 % |
| Barcol hardness (GYZJ-934-1) | 42 – 45 | 50 – 53 |
| Acetone extraction (for 16 hours using Soxhlet) | 3 – 8 % | about 0 % |

Incidentally, the velocity of transporting the FRP molding material in lengthwise direction is within a velocity sufficient to cure the molding material by means of an ionizing radiation, and is easily determined by those skilled in the art with reference to the species and dose rate of an ionizing radiation, the irradiation area such as the scanner area of an electron beam accelerator, and the like. It is considered that the velocity up to about 50 meters/minute can generally be applied.

What we claim is:

1. A process for continuously preparing a fiber reinforced plastic (FRP) flat plate having no warps, comprising:
    covering both the top and bottom surface of a continuous FRP flat plate molding material with film-like sheetings;
    continuously transporting the covered material in the lengthwise direction;
    irradiating the covered material as it is being transported by means of an ionizing radiation until said molding material is cured, said ionizing radiation being β-rays, electron beam, or mixtures thereof, wherein the dose rate is about 0.01 – 20 Mrad/sec with a total dose of about 0.1 – 50 Mrad;
    applying tensions to the film-like sheeting covering the FRP molding material in both the lengthwise and the widthwise directions before and in the course of the irradiation, said tensions being in a degree sufficient to press and hold the molding material so as to maintain the thickness thereof uniform and the surfaces thereof smooth before and in the course of radiation; and
    removing the film-like sheetings from the cured FRP molding material.

2. A process according to claim 1, in which the tensions to be applied to the film-like sheetings in both directions are in the range of about 1 – 20 Kg/mm$^2$.

3. A process according to claim 1, in which said ionizing radiation comprises an electron beam employed at a dose rate of 0.01 – 20 Mrad/sec with a total dose of about 0.1 – 50 Mrad.

4. A process according to claim 1, in which heating is employed after the irradiation.

5. A process according to claim 1, in which the FRP plate molding material comprises a reinforcing fiber material impregnated with a liquid resin material curable by means of an ionizing radiation.

6. A process according to claim 1, in which the distance between the adjoining clips is gradually made larger as the FRP molding material covered with sheetings is transported nearer to the irradiation area.

7. A process according to claim 1, in which the widthwise tension is temporarily loosened after the irradiation.

8. A fiber reinforced plastic (FRP) flat plate having smooth surfaces and no warps, which is continnuously prepared according to the process of claim 1.

9. An FRP flat plate according to claim 8, in which the FRP plate molding material comprises a reinforcing fiber material impregnated with a liquid resin material curable by means of an ionizing radiation is.

10. A process for continuously preparing a fiber reinforced plastic (FRP) flat plate having no warps, comprising:
covering both the top and bottom surface of a continuous FRP flat plate molding material with film-like sheetings;
continuously transporting the covered material in the lengthwise direction;
irradiating the covered material as it is being transported by means of an ionizing radiation until said molding material is cured, said ionizing radiation being α-rays, β-rays X-rays, neutron beam or mixtures thereof, wherein the dose rate is about $10^2$–$10^8$ rad/hr with a total dose of about $10^5$–$10^7$ rad;
applying tensions to the film-like sheeting covering the FRP molding material in both the lengthwise and the widthwise directions before and in the course of the irradiation, said tensions being in a degree sufficient to press and hold the molding material so as to maintain the thickness thereof uniform and the surfaces thereof smooth before and in the course of radiation; and
removing the film-like sheetings from the cured FRP molding material.

11. A process according to claim 10, in which the tensions to be applied to the film-like sheetings in both directions are in the range of about 1 – 20 Kg/mm².

12. A process according to claim 10, in which heating is employed after the irradiation.

13. A process according to claim 10, in which the FRP plate molding material comprises a reinforcing fiber material impregnated with a liquid resin material curable by means of an ionizing radiation.

14. A process according to claim 10, in which the distance between the adjoining clips is gradually made larger as the FRP molding material covered with sheetings is transported nearer to the irradiation area.

15. A process in accordance with claim 10, in which the widthwise tension is temporarily loosened after the irradiation.

16. A fiber reinforced plastic (FRP) flat plate having smooth surfaces and no warps, which is continuously prepared according to the process of claim 10.

17. An FRP flat plate according to claim 16, in which the FRP plate molding material comprises a reinforcing fiber material impregnated with a liquid resin material curable by means of an ionizing radiation.

* * * * *

UNITED STATES PATENT OFFICE
CERTIFICATE OF CORRECTION

PATENT NO. : 3,930,098
DATED : December 30, 1975
INVENTOR(S) : ARAKI, Kunio et al It is certified that error appears in the above—identified patent and that said Letters Patent are hereby corrected as shown below:

Column 3, line 10, delete "asbestes" and insert --asbestos--;
line 65, delete "aluminum" and insert --aluminum--.
Claim 9, column 9, line 10, delete "is" at the end of the line.
Claim 10, column 9, line 23, delete "β-rays" and insert
-- $\gamma$-rays--.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*